United States Patent [19]

Raba, Jr. et al.

[11] Patent Number: 4,498,993

[45] Date of Patent: Feb. 12, 1985

[54] PROCESS FOR THE TREATMENT OF CLAY SLIMES

[75] Inventors: Carl F. Raba, Jr.; Robert L. Smith; Francis Y. Huang, all of San Antonio, Tex.

[73] Assignee: Monier Resources, Inc., San Antonio, Tex.

[21] Appl. No.: 631,460

[22] Filed: Jul. 16, 1984

Related U.S. Application Data

[62] Division of Ser. No. 457,930, Jan. 14, 1983, Pat. No. 4,478,736.

[51] Int. Cl.³ ............................................... C02F 1/56
[52] U.S. Cl. ....................................... 210/710; 210/714; 210/728; 210/734; 210/907
[58] Field of Search ............... 210/702, 712, 714, 716, 210/725, 723, 727, 728, 734, 738, 907, 710; 252/180, 181

[56] References Cited

U.S. PATENT DOCUMENTS

| | | | |
|---|---|---|---|
| 3,388,060 | 6/1968 | Clark | 210/728 |
| 3,680,698 | 8/1972 | Liu | 210/710 |
| 3,700,716 | 10/1972 | Berger et al. | 260/448.2 |
| 3,903,082 | 9/1975 | Berger | 260/243 |
| 3,932,275 | 1/1976 | Mewes | 210/712 |
| 4,024,328 | 5/1977 | Zweigle | 526/54 |
| 4,121,945 | 10/1978 | Hurst | 106/288 |
| 4,216,125 | 8/1980 | Campbell | 252/527 |
| 4,290,896 | 9/1981 | Gordon | 210/710 |
| 4,336,284 | 6/1982 | Wallace | 427/213 |

FOREIGN PATENT DOCUMENTS 1466185  3/1977  United Kingdom ............... 210/907

Primary Examiner—Peter Hruskoci
Attorney, Agent, or Firm—Limbach, Limbach & Sutton

[57] ABSTRACT

A method for dewatering clay slimes comprised of treating the slimes with a fly ash coated with a silane coupling reagent to which is bonded a polyacrylamide flocculant.

10 Claims, 1 Drawing Figure

PROCESS FOR DEWATERING CLAY SLIMES

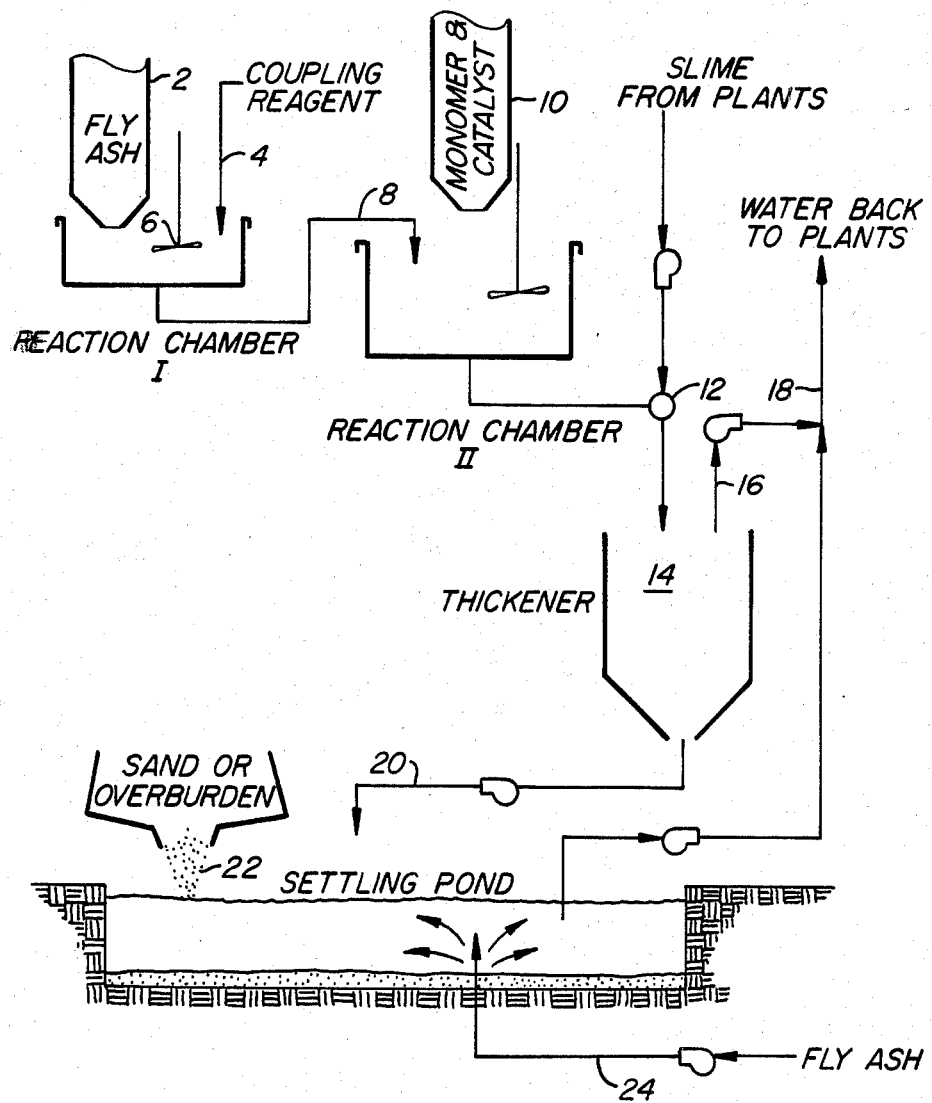
FIG._1.

PROCESS FOR THE TREATMENT OF CLAY SLIMES

This is a division, of application Ser. No. 457,930, filed 1/14/83 now U.S. Pat. No. 4,478,736.

DESCRIPTION

1. Technical Field

This invention relates to an improved process for the treatment of clay slimes wherein a composition comprised of fly ash, a silane coupling reagent and an acrylamide polymer is used to dewater slimes on the surface of settling ponds by increasing the rate of settlement of the slimes in a manner which permits recovery of the pond water.

2. Background Art

Many mineral mining processes are known to generate as by products enormous quantities of clay slimes, resulting in serious problems of waste disposal and water loss. The phosphate rock mining industry, the primary source of phosphorous containing fertilizers essential to modern methods of agriculture, is no exception.

For every ton of phosphate rock produced, a ton of slime is created. The slimes are channeled to ponds where they slowly settle to the bottom. The slowness of the settling process results from the colloidal properties of the montmorillonite and attapulgite content of the slimes which absorb water to form a suspension on the surface of the pond.

Approximately 3,000 acres of new land must be set aside each year to dispose of slimes according to the best methods presently available. As of 1979 there were 60,000 acres in a five county area of Florida devoted to slime settling pond areas. This results in environmental blight, a great demand on fresh water supplies and a hindrance to reclamation of mined land.

Several methods of dewatering slimes have been developed none of which has proven wholly satisfactory. One method incorporates the use of a mechanical raking device to promote release of entrained water.

Settling has been fostered by spreading sand tailings, also produced from phosphate benefication, over the slimes. One disadvantage of this method is that slime production may exceed the generation of sand tailings.

Various coagulants and thickeners have also been added to slimes both in settling and filtration processes, but the resultant processes remain too slow.

Centrifugation has been tried but it is too energy consumptive to be a viable alternative. Solar evaporation and electrical and bacteriological dewatering have also been studied.

One of the more effective methods for dewatering slimes is described in U.S. Pat. No. 3,932,275, issued Jan. 13, 1976. It involved adding a fly ash slurry and a low anionic polyacrylamide solution to the slime to coagulate and settle the solids so that the water could then be drawn off.

Since benefication of phosphate ore utilizes large quantities of water in the washing and flotation process, it is very desirable to recirculate the supernatant water recovered from the slime ponds. The process of U.S. Pat. No. 3,932,275 has the disadvantage, however, of leaving too much polymer residue in the supernatant for the water to be completely reusable.

It is the primary object of this invention to increase the rate of clay slime settlement by increasing the solids content of the slime from less than 3.0% to more than 10%.

It is also an object of this invention to utilize fly ash, a waste product from the combustion of pulverized coal, thereby conserving natural resources.

It is a further object of this invention to provide a method of settling slime which permits recovery of slime pond water.

It is a final object of this invention to provide a method of settling slime which requires a minimal input of energy.

DISCLOSURE OF THE INVENTION

This invention is drawn to a composition for dewatering clay slimes comprised of fly ash coated with a silane coupling reagent ad polyacrylamide and the method of making and using that composition.

The method of preparing the composition consists of: (a) hydrating a quantity of fly ash, (b) combining the hydrated fly ash with a room temperature silane solution in a ratio of approximately 1 gram of fly ash per 4 milliliters of 1% by volume silane solution to form a suspension, (c) maintaining an acidic pH, (d) stirring the suspension for approximately 40 minutes to couple the silane to ash, (e) removing the silane coated ash, (f) combining the coated fly ash with acrylamide monomer, water and catalysts to initiate polymerization, (g) heating the mixture until the temperature of the reactants reaches 65° C., (h) providing a means for deoxygenating the mixture during reaction, (i) maintaining a pH of approximately 6, and (j) allowing the reaction to proceed to the desired degree of polymerization.

This invention also includes a method for dewatering clay slimes comprising the following steps: (a) hydrating fly ash; (b) reacting the hydrated fly ash with a silane coupling reagent; (c) polymerizing the fly ash with an acrylamide monomer; (d) using the polymerized fly ash to flocculate a clay slime diluted to a less than 3% solids content; (e) allowing the flocculated slime to settle; and (f) recovering the supernatant water.

DESCRIPTION OF DRAWING

FIG. 1 is a conceptualized flow chart for the process for dewatering mineral slimes. Fly ash is charged 2 into a reaction chamber with a silane coupling reagent 4. The fly ash and silane solution are mixed together 6 and then removed 8 to a second reaction chamber where monomer and catalysts are added 10 to initiate polymerization;

The polymerized fly ash is charged 12 into a stream of slime to produce flocs and the entire mixture is charged 14 to a thickener. Supernatant water is recovered 16 and recirculated 18 to a benefication plant. The consolidated slime is then transported 20 to a settling pond where it may be treated 22 with additional sand to aid settling. Additional fly ash may be pumped 24 into the pond to enhance settlement.

BEST MODE FOR CARRYING OUT THE INVENTION

The typical mineralogical composition of the Florida phosphate slimes used to test this invention are shown in Table 1.

TABLE I

Mineralogical Composition of Florida Phosphate Slime

| Mineral | Wt pct | Theoretical Comp. |
|---|---|---|
| Carbonate-fluorapatite | 20–25 | $Ca_{10}(PO_4,CO_3)_6F_{2-3}$. |
| Quartz | 30–35 | $SiO_2$. |
| Montmorillonite | 20–25 | $(Fe,Al,Mg)_2(Al,Si)_4O_{10}(OH)_2$ |
| Attapulgite | 5–10 | $(Mg,Al,Fe)_5(Al,Si)_6O_{20}(OH)_28H_2O$ |
| Wavellite | 4–6 | $Al_3(OH)_3(PO_4)_25H_2O$. |
| Feldspar | 2–3 | $KAlSi_3O_8 + NaAlSi_3O_8$. |
| Heavy minerals | 2–3 | Zircon, garnet, ilmenite, rutile |
| Dolomite | 1–2 | $CaMg(CO_3)_2$. |
| Miscellaneous | 0–1 | Kaolonite, crandallite, hydrated Fe-oxide, organic. |

The actual slime sample used in testing the invention and its comparison to typical slimes is shown in Table II.

TABLE II

Mineralogical Composition of Phosphate Slime

| Minerals | Analysis Results, % | Published Range, % |
|---|---|---|
| α-$SiO_2$ (quartz sand) | 5.1 | 30–35 |
| Feldspar | 2.5 | 2–3 |
| Montmorillonite | 68.7 | 20–25 |
| Illite (degraded mica) | 16.7 | no mention |
| Kaolinite | 1.6 | 0–1 |
| $Ca_5(PO_4)_3OH$ (hydroxyapatite) | 5.5 | 20–25 |
| Attapulgite | 0 | 5–10 |

Fly ash is a known aid in the sedimentation of clay slimes. Various polymers are known slime flocculating agents. However, the polymer particles remaining after slime settlement have previously prevented the reclamation of slime pond water.

It has now been discovered that the benefits of both fly ash in sedimentation and polymer flocculation can be obtained while increasing the purity of recovered water when the polymer is chemically bonded to the fly ash.

Table III shows the chemical components of fly ash taken from sources in both the eastern and western United States.

TABLE III

Chemical Components of Coal-Fired Fly Ashes

| Components | Eastern Fly Ash (%) | Western Fly Ash (%) |
|---|---|---|
| Silica ($SiO_2$) | 40–55 ⎫ | 20–40 ⎫ |
| Alumina ($Al_2O_3$) | 25–35 ⎬ 64–90 | 10–30 ⎬ 30–70 |
| Ferric Oxide ($Fe_2O_3$) | 5–24 ⎭ | 3–10 ⎭ |
| Magnesium Oxide (MgO) | ½–5 | ½–8 |
| Sulfur Trioxide ($SO_3$) | ½–5 | 1–8 |
| Titanium Dioxide ($TiO_2$) | ½–2 | ½–2 |
| Carbon (C) | ½–12 | ½–2 |
| Moisture | 0–3 | ½–3 |
| Calcium Oxide (CaO) | ½–4 | 10–32 |
| Potassium Oxide ($K_2O$) | ½–3 | ½–4 |
| Sodium Oxide ($Na_2O$) | ½–1½ | ½–6 |

The fly ash used in the composition and process of this invention, taken from the Crystal River (Florida) Power Plant, is typical of that from other sources in the eastern United States. Its chemical and physical properties are shown in Table IV.

TABLE IV

Chemical and Physical Analysis of Crystal River Fly Ash

| | Results % |
|---|---|
| Chemical Analysis | |
| Silicon Dioxide ($SiO_2$) | 44.7 |
| Aluminum Oxide ($Al_2O_3$) | 22.6 |
| Iron Oxide ($Fe_2O_3$) | 10.5 |
| Calcium Oxide (CaO) | 1.9 |
| Magnesium Oxide (MgO) | 0.73 |
| Sodium Oxide ($Na_2O$) | 0.46 |
| Potassium Oxide ($K_2O$) | 2.4 |
| Sulfur Trioxide ($SO_3$) | 0.86 |
| Moisture Content | 0.18 |
| Loss on Ignition | 2.7 |
| Physical Analysis | |
| Retained on 325 Sieve, % | 23.0 |
| Specific Gravity | 2.24 |
| Specific Surface, $cm^2/g$ | 1560 |

In order to effectively chemically bond the inorganic fly ash to the organic polymer, the fly ash must be pretreated with a coupling agent. Silane coupling agents are ideally suited to bond to mineral surfaces.

Since fly ash is generally stored in land fill in a dry state, it is desirable to hydrate the ash so that there are more ≡Si—OH and ≡Al—OH reactive sites for the attachment of the coupling agent.

Silane coupling agents from the family of organosilicon monomers have the formula:

$$R-SiX_3$$

where
R = an organofunctional group; and
X = a hydrolizable group

Prior to use the coupling agent must be converted to reactive silanol by hydrolysis, according to the reaction:

$$R-SiX_3 + 3H_2O \rightarrow R-Si(OH)_3 + 3HX.$$

Table V includes a list of silane coupling agents suitable for use in this invention.

TABLE V

Silane Coupling Agents

| Chemical Type | Chemical Name | Chemical Formula |
|---|---|---|
| Methacrylate | 3-Methacryloxypropyl trimethoxysilane | $CH_2{=}CH-\underset{\underset{CH_3}{\vert}}{C}-\underset{\underset{O}{\Vert}}{\,}O(CH_2)_3Si(OCH_3)_3$ |

TABLE V-continued
Silane Coupling Agents

| Chemical Type | Chemical Name | Chemical Formula |
|---|---|---|
| Styrylamine Cationic | 3[2(Vinyl benzyl-amino)ethylamino] propyltrimethoxy | $CH_2=CH-C_6H_4-CH_2NH(CH_2)_2NH(CH_2)_3-Si(OCH_3)_3 \cdot HCl$ |
| Vinyl | Triacetoxy-vinylsilane | $CH_2=CHSi(OOCCH_3)_3$ |
| Vinyl | Tris (2-methyoxy-ethoxy) vinylsilane | $CH_2=CHSi(OCH_2CH_2CH_2OCH_3)_3$ |

The following are examples of coupling reaction sequences between various silanes and the $\equiv$Si—OH and $\equiv$Al—OH groups on fly ash:

I. Ash treated with 3-Methacryloxypropyl trimethoxysilane.

$$(CH_3O)_3Si(CH_2)_3O-\overset{O}{\underset{\|}{C}}-\overset{CH_3}{\underset{|}{C}}=CH_2 + 3H_2O \longrightarrow$$

$$(HO)_3Si(CH_2)_3O-\overset{O}{\underset{\|}{C}}-\overset{CH_3}{\underset{|}{C}}=CH_2 + 3CH_3OH$$

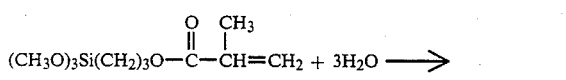

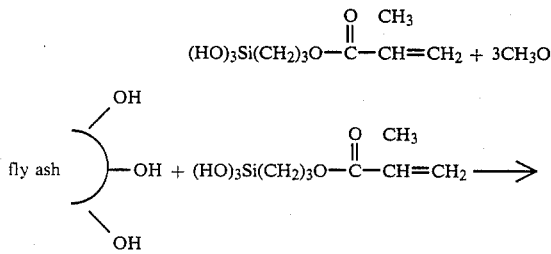

II. Ash treated with Triacetoxyvinylsilane.

$$(CH_3\overset{O}{\underset{\|}{C}}O)_3SiCH=CH_2 + 3H_2O \longrightarrow$$

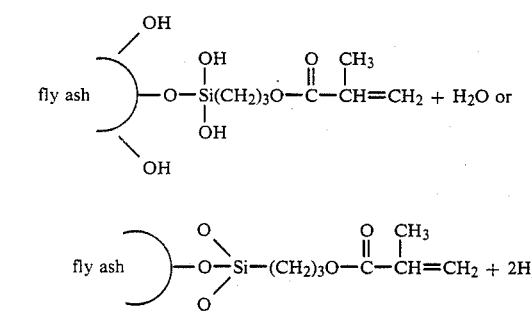

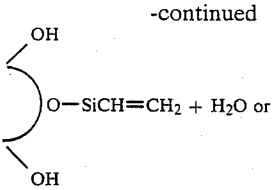

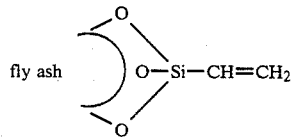

III. Ash treated with Tris(2-Methoxyethoxy)vinylsilane.

$$(CH_3OCH_2CH_2O)_3SiCH=CH_2 + 3H_2O$$

$$(HO)_3SiCH=CH_2 + CH_3OCH_2CH_2OH$$

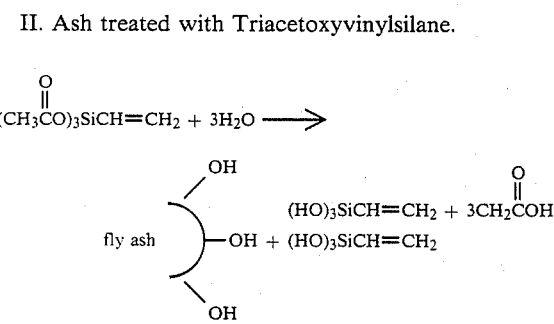

The modification of fly ash with a silane coupling agent can be carried out in the manner described below.

EXAMPLE 1

Modification of fly ash with
N-(2-aminoethyl)-3-amino-propyltrimethoxy silane To a beaker of 400 milliliters (ml) of 1% by volume (VV) of the silane solution at room temperature, 100 grams (g) of fly ash were added. The resulting suspension was stirred for 30 minutes. A pH of 4 was maintained by the addition of $H_2SO_4$.

The ash was then filtered and washed thoroughly with a copious amount of water followed by oven drying overnight at approximately 100° C.

Forty (40) g of dried ash were placed in a beaker containing 100 ml of water and 1 ml of $1MCu(II)Cl_2$. The mixture was stirred for 10 minutes. After filtering and washing, the ash was digested with 100 ml of 50% $HNO_3$ on a hot plate until a dryness was obtained.

The residue was mixed with 80 ml of water and was filtered again. The filtrate was diluted to 100 ml with deionized water and analyzed by graphite furnace AA using a Perkin-Elmer Atomic Absorption Model 5000.

For comparison, 100 g of silica gel were also treated in accordance with the above procedure.

The result as shown by the amount of copper chelated on fly ashes as correlated with the length of hydration period of the ash is shown in Table VI.

TABLE VI

| | Effects of Water Soaking Time of Fly Ash on Silane Coating Efficiency | |
|---|---|---|
| Soaking Time (days) | $Cu^{+2}$ Chelated (moles/gram)** × $10^7$ | Percentage Compared to that of Silica Gel |
| 1 | 1.6 | 7.7 |
| 3 | 1.3 | 6.2 |
| 7 | 1.8 | 8.7 |
| 14 | 4.9 | 23.7 |
| 21 | 8.7 | 42.2 |
| Silica gel (as is) | 20.6 | 100.0 |

*100 grams of ash and silica gel were used in 400 ml of 1% silane soln.
**Determined by graphite furnace AA.

Soaking times of less than seven days did not effectively hydrate the surface of the ash to provide sufficient reactive sites for the silane.

Polyacrylamide polymers have been found to be among the most efficient flocculants for phosphatic clay slimes as well as other mineral suspensions such as quartz, microcline, calcite, kaolinite and fluorspar.

In general, polymerization of an acrylamide monomer is initiated with catalysts such as hydrogen peroxide, persulfates, perborates and permanganates.

Initiation can also be effected by a redox system consisting of a stoichiometrically equivalent amount of oxidizing and reducing reagents. Suitable oxidizing components are the inorganic peracid salts, such as ammonium, sodium and potassium persulfates and perdisulfates and sodium and potassium perborates, which do not compose rapidly under 65° C. Suitable reducing components are sulfites, bisulfites, thiosulfites and alkyl sulfites.

The amount of catalyst used may be varied widely depending upon the particular kind of catalyst and other polymerization conditions. Generally, the amount of each component of the catalyst system is within the range of 0.005% to about 0.3 or 0.4% by weight of the total monomers.

To prevent premature termination of the chain reaction, an excess oxygen exclusion process is essential. General deoxygenation procedures include purging the system with inert gases such as nitrogen, helium and argon.

The monomer may be polymerized according to Example 2, and then reacted with the silane treated fly ash, or it may be polymerized in situ with the fly ash as in Example 3.

EXAMPLE 2

Polymerization of Monomer

At room temperature, 47.5 parts (17.5 g) of acrylamide and 949.8 parts (350.0 ml) of de-ionized water were charged into a reactor. The solution was stirred at a low stirring rate with an impeller-type stirrer while nitrogen gas was bubbled through at a vigorous rate for deoxygenation.

A total of 0.144% (0.252 g) of ammonium persulfate and 0.0360% (0.0063 g) of sodium sulfite was added to the monomer solution. The percentages were based upon the total weight of monomers including the 0.065% stoichiometrically equivalent amount of ammonium persulfate plus an additional 0.079%.

When the temperature of the reactants reached 65° C., the heat was turned off. The exothermic heat of the polymerization reaction caused the temperature to rise above 78° C. within forty minutes. The nitrogen was was stopped at this point. The resultant product was a viscous polymer.

During the reaction samples of reactants were withdrawn at 10 minute intervals and subjected to gas chromatograph mass spectrometry analysis to determine the presence of residual acrylamide. The analysis indicated that the reaction was 90% completed at forty minutes. Thereafter the rate of monomer conversion lessened.

Molecular weight of this resulting polymer was determined by size exclusion chromatograms using a high pressure liquid chromatography method. The results indicated that 92.8% of the polymers were in the molecular weight range of 1,000 to 32,000 with an average at 11,000. The resulting polymer mixture contained 5% polymer.

The in situ polymerization of fly ash can be carried out by the method generally described as follows.

EXAMPLE 3

In Situ Polymerization of Monomer
Attached to Silane Treated Fly Ash

Forty (40) grams of silane treated fly ash, virgin or soaked, and 160 ml of water were charged to the reactor. (Since the surface of silane treated fly ash contains unsaturated vinyl functional groups, it can participate in the polymerization reaction.) The pH of the mixture was adjusted to 6 with concentrated $H_2SO_4$. Then a certain amount of triacetoxyvinylsilane was added to have the desired concentration, e.g. 120 $\mu l$ for 0.075% or 80 $\mu l$ for 0.05% by volume. Immediately after it had been stirred for 30 minutes, a volume of 100 ml of $H_2O$ was added and pH of the solution was adjusted to 6 again. The system was then purged with nitrogen gas, while a total of 17.5 g of acrylamide, 0.126 g of ammonium persulfate and 0.0315 g of sodium sulfate were added. The mixture was heated to 65° C. and the polymerization reaction was allowed to proceed until the viscosity reached its maximum about 60 minutes later.

Testing Results

The effectiveness of the polymerized fly ash as a composition for the treatment of phosphate slime was tested in the following manner.

Slime was diluted with de-ionized water to a solids content of approximately 2.6%. The diluted slime was charged into a hydrometer glass cylinder to the 950 ml mark. Approximately 0.1–1.0 g of the polymerized fly ash solution of Example 3 was mixed with 50 ml of water in a beaker to form a slurry.

The slurry was then added to the cylinder containing the slime. The contents of the cylinder were mixed by plunging an agitating bar from top to bottom three times. Flocs formed immediately.

Photomicrographic analysis revealed that the fly ash surface bound polymers formed "bridges" between the ash and slime particles. The weight of the ash increased the weight of the polymer flocs, resulting in sedimentation without the aid of mechanical means.

The solids content of the sediment was found to be proportional to the amount of polymerized fly ash. After 70 minutes of settling, slime to which 1.0 g of polymerized ash had been added was found to have achieved a solids content of 8.0% when the ash had been hydrated for 54 days. After 45 minutes settling time, slime to which 1.0 g of polymerized ash pre-soaked for 14 days had been added resulted in a solids content of 7.3%.

Table VII shows the water quality of the supernatant as tested for residual polymer and total organic carbon (TOC). The majority of polymers were either bound onto fly ash or absorbed by slime particles and settled to the bottom of the cylinder with slime flocs.

TABLE VII

Quality of Slime Supernatant Water after Settlement.

| Sample | Description of Sample | TOC (mg/l) | Molecular Weight distribution of trace polymer ($\overline{Mw}$) |
|---|---|---|---|
| 1 | Supernatant water of slime without poly-ash (blank) | 7 | 25.1 to 0.6 × 10³ (1) (4.86 × 10³) |
| 2 | Slime with 0.1 g of poly-ash | 8 | 25.1 to 0.36 × 10³ (2) (4.86 × 10³) |
| 3 | Slime with 0.3 g of poly-ash | 6 | 7.9 to 0.2 × 10³ (2) (2.19 × 10³) |
| 4 | Slime with 0.6 g of poly-ash | 7 | 11.2 to 0.16 × 10³ (2) (2.06 × 10³) |
| 5 | Slime with 0.8 g of poly-ash | 9 | 20.0 to 0.13 × 10³ (2) (2.7 × 10³) |
| 6 | Slime with 1.0 g of poly-ash | 8 | 3.20 to 0.06 × 10³ (2) (2.2 × 10³) |
| 7 | 1.0 g of poly-ash in 1 liter of de-ionized water (control) | 31 | (A) 78% of total: 32.0 to 2.2 × 10³ (B) 22% of total: 2.00 to 0.1 × 10³ |

(1) Contribution from natural polymer in the water of phosphatic slime.
(2) Background of natural polymer had been subtracted from the chromatograms.

The polymers remaining in the water would have no detrimental effect on phosphate benefication. No toxic metals were found in the water.

Table VIII shows that the gains in settling are inversely proportioned to the initial solids content, indicating that slime is preferably diluted to a solids content of less than 3% prior to treatment.

TABLE VIII

Gain in Solids Content in the Flocculated Slime for Various Initial Solids Content*

| Initial Solids Content (A) | Final Solids Content at t = 90 min. (B) | Gain $\left( = \frac{B}{A} \right)$ |
|---|---|---|
| 2.0 | 6.6 | 3.3 |
| 3.0 | 7.4 | 2.4 |
| 3.5 | 7.6 | 2.2 |
| 5.0 | 7.4 | 1.5 |

*0.8 grams of 54-day pretreated poly-ash used to 1 liter of slime.

In the field application of this invention hydrated fly ash is placed in a reaction chamber for coating with the silane coupling agent. Then the coated ash is either moved to a second reaction chamber or monomer and catalysts are added to the reaction vessel for polymerization. The mixture is then heated to initiate polymerization and purged of excess oxygen.

Upon completion of polymerization the polymerized ash is charged to the slime flowing from the mineral benefication process through a metering pump. It is mixed with incoming slime having a solids content of approximately 3%. The resulting flocs and partially clarified water are charged to a mechanical thickener or a trommel.

Recovered water is returned to the benefication plant. Consolidated slimes are transported to settling ponds for further dewatering. Additional sand tailings or fly ash may be added to the slime to enhance settling.

We claim:

1. A method for dewatering clay slimes diluted to less than 3% solid content comprising the following steps:
    a. Hydrating fly ash for at least 7 days;
    b. Reacting the hydrated fly ash with a silane coupling agent to couple the silane to the ash;
    c. Polymerizing the fly ash with an acrylamide monomer to form an acrylamide flocculant chemically bonded to said fly ash through said silane;
    d. adding an effective amount of the polymerized fly ash to flocculate said clay slime;
    e. Allowing the flocculated slime to settle; and
    f. Recovering the supernatant water.

2. A method according to claim 1 in which the fly ash is hydrated for 7–21 days.

3. A method for dewatering clay slimes according to claim 1 in which the silane coupling agent is selected from the group consisting of 3-methacryloxypropyl trimethoxysilane, 3[2(vinyl benzylamino)ethylamino]-propyltrimethoxy silane, triacetoxy-vinylsilane and tris(2-methoxyethoxy)vinylsilane.

4. A method according to claim 3 in which the silane coupling agent is 3-methacryloxypropyl trimethoxy silane.

5. A method according to claim 3 in which the silane coupling agent is triacetoxyvinylsilane.

6. A method according to claim 3 in which the silane coupling agent is tris(2-methoxyethoxy)vinylsilane.

7. A method according to claim 3 in which the fly ash is polymerized by reacting it with the silane coupling agent, acrylamide monomer, and catalysts.

8. A method according to claim 3 in which the fly ash is reacted with the silane coupling agent prior to reacting it with acrylamide monomer.

9. A method according to claim 1 in which the clay slime is the waste product of a phosphate benefication process.

10. A method according to claim 9 comprising the following steps:
   a. Hydrating fly ash for 7–21 days;
   b. Charging the hydrated fly ash into a reactor containing 4 milliliters of water per gram of fly ash;
   c. Maintaining a pH 6 by the addition of concentrated sulfuric acid;
   d. Adding sufficient triacetoxyvinylsilane to produce a 0.075 to 0.05% by volume silane solution concentration;
   e. Stirring the solution for 30 minutes;
   f. Adding additional water;
   g. Purging the contents of the reactor with nitrogen gas while adding 47.5 parts acrylamide monomer to 949.8 parts water and 0.144% by monomer weight of a stoichiometric amount of ammonium persulfate plus sodium sulfite;
   h. Heating the mixture to 65° C. to polymerize the monomers and react with the fly ash;
   i. Diluting the phosphate slime with deionized water to obtain a less than 3% solids concentration;
   j. Charging the polymerized ash into a flow of diluted slime to flocculate slime particles;
   k. Charging the mixture of slime and flocs into a mechanical thickeners;
   l. Allowing the solids to consolidate and recovering the supernatant water;
   m. Transporting the consolidated slimes to settling ponds; and
   n. Adding sand to the settling pond to facilitate settlement of the slime.

* * * * *